Patented June 22, 1948

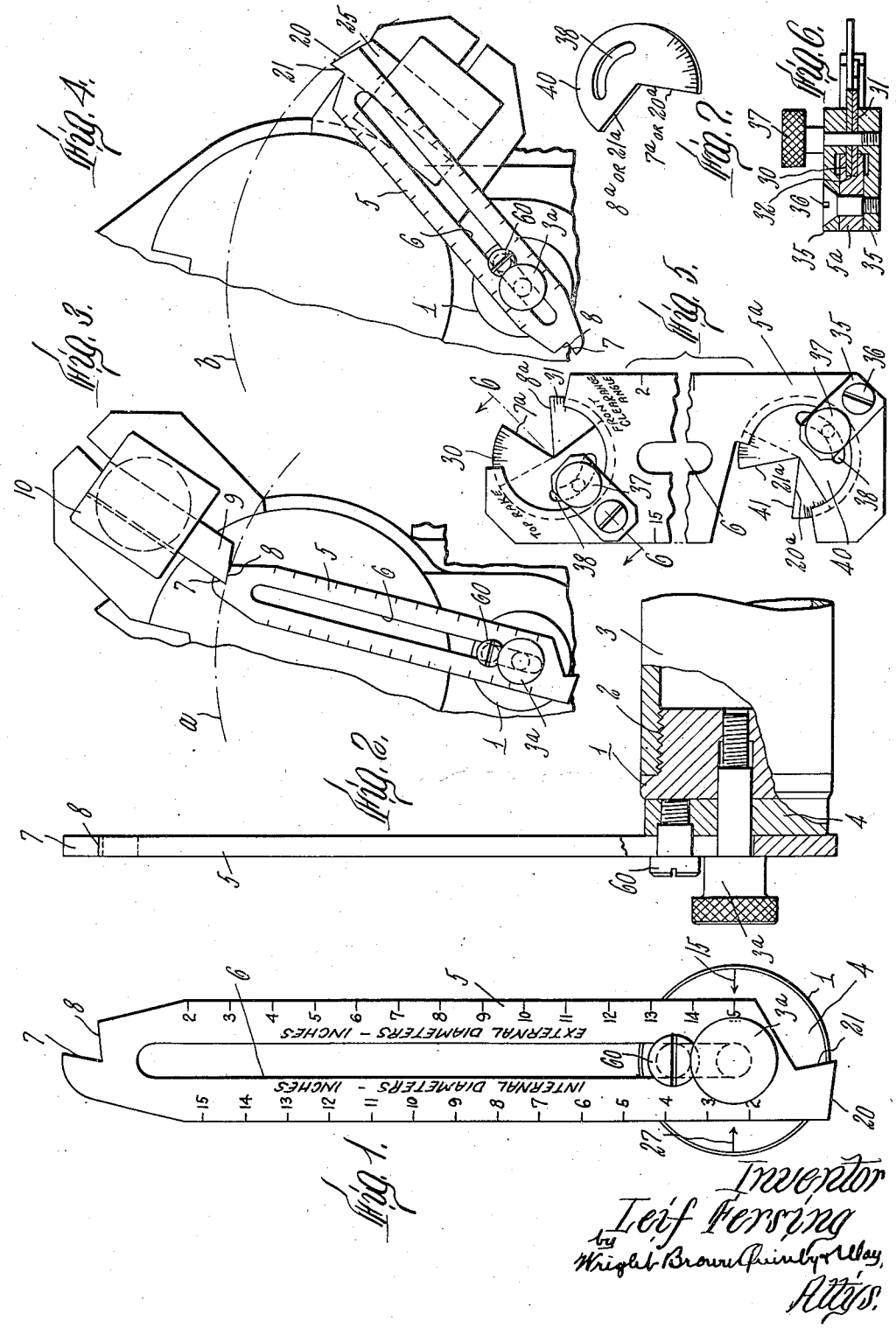

2,443,704

UNITED STATES PATENT OFFICE 2,443,704

TOOL POSITIONING GAUGE

Leif Fersing, Springfield, Vt., assignor to Jones & Lamson Machine Company, Springfield, Vt., a corporation of Vermont Application November 15, 1944, Serial No. 563,601

2 Claims. (Cl. 33—185)

This invention relates to gages for assisting in the proper positioning of tools, particularly turning tools with relation to the work so that such tools may operate on the work most effectively. To this end the gage comprises a bar mounted for angular adjustment about the axis of the work and adjustable to project a gaging portion at the desired distance from that axis, the gaging portion having angularly related faces showing the proper positions of similar or complemental faces of a tool for operating on the work. If desired, the angularly related gage faces may be on pieces separate from the bar and adjustably fixed in relation thereto. A gage constructed in accordance with this invention may be mounted either on the work spindle carrier or on the tool holder as may be desired.

For a more complete understanding of this invention, reference may be had to the accompanying drawings in which:

Figures 1 and 2 are front and side elevations, respectively, of the gage, Figure 2 showing it partly broken away and in section as carried by a tool carrier.

Figure 3 is a fragmentary front elevation showing the gage in gaging relation to a tool for external turning.

Figure 4 is a view similar to Figure 3, but showing the gaging action for a tool arranged for internal cutting.

Figure 5 is a fragmentary front elevation showing adjustable external tool gaging elements.

Figure 6 is a detail section on line 6—6 of Figure 5.

Figure 7 is a perspective view of one of the adjustable tool engaging elements employed in the construction of Figure 5.

Referring first to Figures 1 and 2, at 1 is indicated a support shown as having a threaded portion 2 which may be engaged in an internally threaded tube 3, this tube being arranged to be supported in any suitable manner coaxial with the work which is to be operated upon by the tool. Pivoted coaxially with the tube 3, as on the pivot thumb screw 3a, is a gage element comprising a disk 4 and a shank or flat bar 5 having a longitudinal slot 6 therethrough. This slot is arranged to have passed therethrough a screw 60 which is threaded into the disk 4 and serves to define an angular relation of the shank 5 to the disk 4 which is clamped in adjusted angular position by the screw 3a. One end of the shank 5 is formed with two angularly related faces 7 and 8. The face 7 corresponds to the proper top rake angle of a tool 9 which it is desired to locate in its holder 10 to cut external work at a diameter indicated by the broken line a. The face 8 is at the proper angle for the front clearance of the tool. One side of the shank may have length graduations indicated thereon co-cooperating with an index line 15 on the forward face of the support 1, these indications being so arranged as to show to the workman the diameter of the work cut when the tool is positioned with its faces mating the faces 7 and 8 of the gage. Similarly the opposite end of the shank 5 may be provided with angularly related faces 20 and 21, the face 20 indicating the proper front clearance angle for a tool for internal cutting and the face 21 the proper top rake angle for this tool. It will be noted that the faces 7 and 8 are at angles complemental to the tool faces, the tool faces directly engaging the gage faces as shown in Figure 3. The faces 20 and 21, however, are identical with the tool faces when properly positioned, instead of complemental thereto.

The internal cutting tool is shown at 25 in Figure 4 and when arranged as shown it is adapted to cut an internal diameter shown by the broken arcuate line b, the diameter then being shown by the indications on the left side of the gage shank with reference to the index line 27.

While the manner of mounting of the tool may be chosen as desired, the construction shown is that of the multiple turning head fully shown and described in my application for United States Letters Patent Serial No. 563,602, filed November 15, 1944, for Multiple turning head.

Instead of employing a gage with fixed angularly related gaging faces, its gaging faces may be formed on elements separate from the shank and adjustably related thereto. For example, in Figure 5 the external gaging faces 7a and 8a are formed on segments 30 and 31, respectively, which are seated in a segmental groove 32 in the edge of the shank 5a and are held in adjustable position by a clamp comprising a pair of clamping plates 35 on opposite faces of the shank 5a and secured together therethrough by the screw 36. These clamping plates are also provided with holes to receive a thumb screw 37 threaded into one of these plates 35 and passing through arcuate slots 38 in the segments 30 and 31. When the segments have been adjusted to proper angular position, they are tightened in place by tightening the screw 37.

Similarly in Figure 5 segments 40 and 41 having faces 20a and 21a, respectively, may be provided and relatively adjusted corresponding to the tool faces 20 and 21 of Figure 1. These segments may be mounted similarly to the segments 30 and 31 and be used for gaging internal cutting tools.

The use of separate adjustable disks permits adjustment for tool face angles suitable for tools of different type or operating on different materials. These disks may have angle graduations thereon to facilitate such adjustment.

From the foregoing description of embodiments of this invention it should be evident to those skilled in the art that various other changes and modifications might be made without departing from the spirit or scope of this invention.

I claim:

1. A gage comprising a support having a pivot portion substantially coaxial with work to be operated upon, a shank member mounted for pivotal and lengthwise adjustment on said pivot portion, said shank member having an arcuate groove therein, a pair of segments adjustably seated in said groove and having radial ends angularly spaced such that said ends may correspond to the top and front faces of a tool having the proper top rake and front clearance to operate on such work, and means for fixing said segments in adjusted angular position in said groove.

2. A gage comprising a support, a member, a pivot clamp screw connecting said member to said support for angular adjustment of said member relative to said support, a shank member having a longitudinal slot through which said pivot screw passes for longitudinal adjustment of said shank member relative to said pivot screw, and means carried by said first mentioned member and engaging in said slot for holding said shank member in fixed angular relation to said first mentioned member, said shank member having angularly related faces for locating top and front faces of a tool in proper working relation to a work piece arranged substantially coaxially with said pivot screw.

LEIF FERSING.

REFERENCES CITED

The following references are of record in the file of this patent:

UNITED STATES PATENTS

| Number | Name | Date |
|---|---|---|
| 624,535 | Powel | May 9, 1899 |
| 1,046,296 | Hines | Dec. 3, 1912 |

FOREIGN PATENTS

| Number | Country | Date |
|---|---|---|
| 485,656 | France | 1918 |